United States Patent Office 2,816,500
Patented Dec. 17, 1957

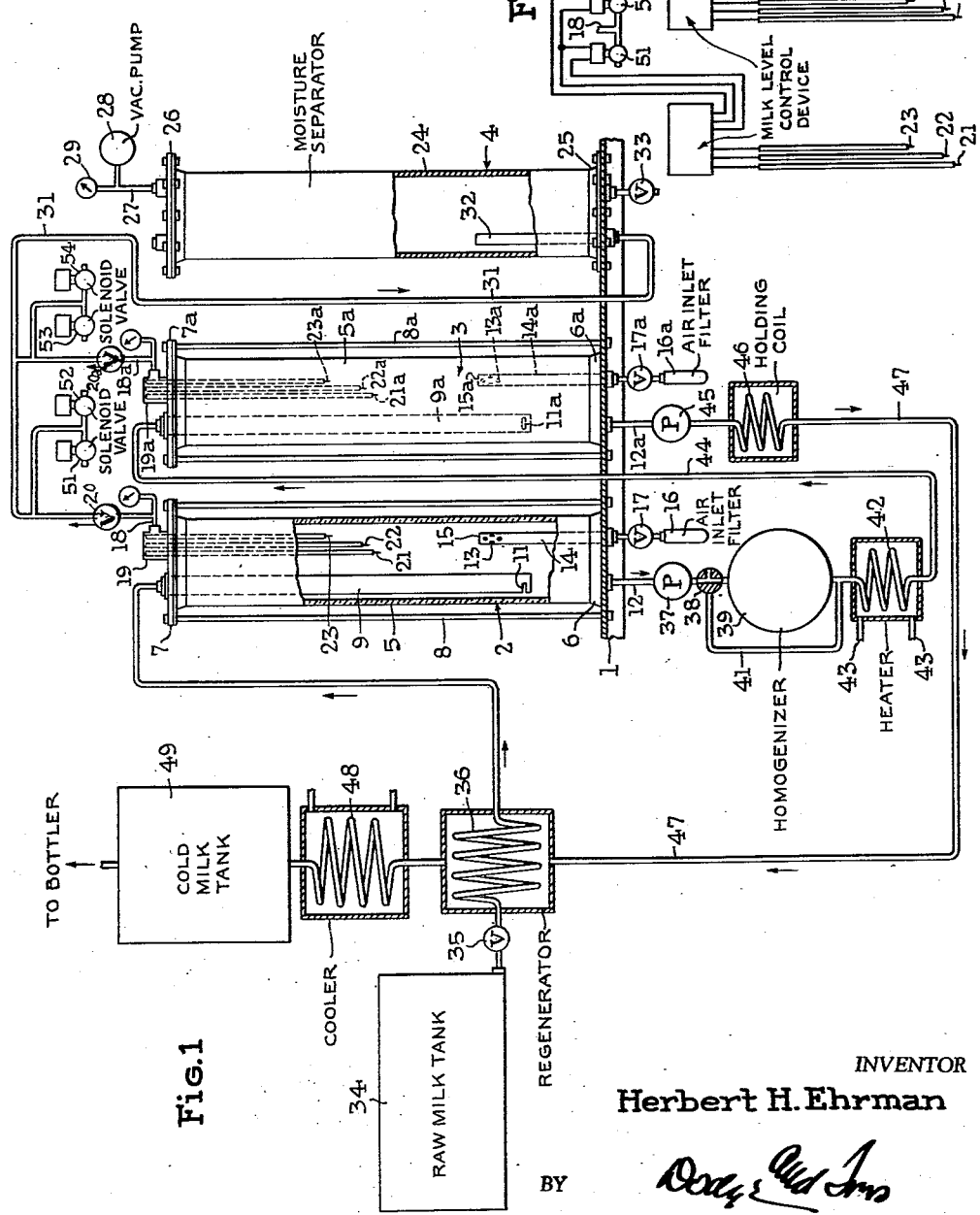

2,816,500

TREATMENT OF MILK

Herbert H. Ehrman, York, Pa., assignor to Borg-Warner Corporation, Chicago, Ill., a corporation of Illinois Application July 12, 1956, Serial No. 597,469

8 Claims. (Cl. 99—252)

This invention relates to the treatment of milk and offers a co-ordinated procedure and apparatus which successfully combines pasteurization, homogenization and removal of undesirable constituents of raw milk, such as occluded gases and undesirable volatiles both malodorous and other.

These treatments are individually known and attempts have been made to combine them so as to save heat and pumping power and shorten the time of treatment; but serious difficulties have been encountered for reasons which will first be outlined to offer basis for explaining the utility of details of applicant's procedure.

Milk is a delicate product easily harmed by crude mechanical treatment and severe heating and cooling. Pasteurization involves basically a heating and cooling cycle in which time factors as well as temperatures are critical. Milk boils violently thus liberating gases when heated under varying sub-atmospheric pressures and unless these gases are removed before homogenization they cause excessive vibration of milk lines and the homogenizer. Unless this gas is removed it travels along with the milk through the bottling machine to the bottles and results in partly filled bottles which are objectionable. The pasteurizing cycle practically requires the use of surface heat exchangers, and these must be readily cleanable. Plate type exchangers are usually preferred because readily cleaned, but these are susceptible to becoming gas bound, and hence are vulnerable to disturbing effects if the unit for purging gases or vapors is unfavorably located or subject to malfunctioning. This has been a source of discouraging and elusive failures.

Purging occluded gases and undesirable volatiles from liquids is best effected while the liquid is in a heated state, and this fact seems to offer attractive possibilities for combining purging with pasteurization. Commercial realization of these possibilities has eluded many. The invention offers a simple way to reach the objective. The important thing turns out to be design and location of the purger so that the gases liberated are removed immediately so as to get them out of the heat exchangers and the milk stream as fast as they are produced. Best results are had by staging the purging at different temperatures, the second temperature higher than the first and approximating the final or pasteurizing holder temperature. Separate purge tanks are used.

While two stages offer advantages, the purger to be disclosed offers advantages in single stage operation which is possible with superior grades of raw milk.

Gases and vapors are drawn off from the purger at sub-atmospheric pressures (about 5 pounds absolute) from the tops of the tall, narrow purge tanks, by a vacuum pump whose suction effect is controlled by bleeding air to its intake at controlled rates. This air will be called suction-controlling air and is distinct from the scrubbing air, about to be mentioned. Filtered air for scrubbing the milk is drawn in at the bottoms of the tanks and caused to discharge into the milk in small bubbles. The treated milk is drawn off from the bottoms of the tanks by milk pumps one below the bottom of each tank and hence gravity-fed. The homogenizer, if used, is interposed in the path of the milk from the first purge tank to the second. One of its effects is to free some occluded gas which the second purge tank then eliminates. A valve controlled by-pass is provided to cut the homogenizer out of the milk path.

The purging operation is very simple. The vacuum pump is controlled as to the sub-atmospheric pressure which it develops by regulating the suction-controlling air by some means responsive to the liquid levels in the purge tanks. Hence these liquid levels remain approximately constant. Scrubbing air drawn in near the bottom of the tank bubbles up through the milk. The milk to be treated is jetted against a side wall of the tank near the bottom and produces turbulent flow so that contact of the rising scrubbing air bubbles with the milk is intensified. The milk is never sprayed. No mechanical agitators are used.

The scrubbing air, the occluded gases and the vapors freed from the heated liquid by the reduced pressure, rise through the milk and leave the tanks at the top, passing to and through the vacuum pump. The milk so freed of gases and vapors is discharged at the bottoms of the tanks. One purge unit is placed in the milk stream after each heat exchanger where the gas is liberated. Applicant has found that a much greater percentage of total occluded gases are liberated in the regenerator, which is a heat recuperator, where the milk first enters and finally leaves the circuit.

The invention therefore involves the co-ordination of several factors into a well balanced system capable of using commercial exchangers and other commercial apparatus.

Important features of novelty are the construction of the purgers, the scheme of staged purging, location of the homogenizer between purging stages, and the use of a suction controlled vacuum pump. The regenerator, the heater, and the holder coil are basic components of a pasteurizer, but they are also functionally related to the purge tanks in such manner as to be protected against entrance of gases and vapors freed in the purgers. The suction control illustrated as used with the vacuum pump is a commercial device available in the open market and is typical of any acceptable suction control.

A preferred embodiment will now be described by reference to the accompanying drawing, in which:

Fig. 1 shows the milk path largely in diagram. However, the first purge tank is shown partly in section and the second purger is shown in elevation to show proportions and significant structural details. For the same reason the moisture separator is shown partly in section.

Fig. 2 is a diagram which relates the electrodes to the bleed valves for suction-controlling air.

A supporting plate 1 carries the first and second purge units and the moisture separator, generally indicated by the numerals 2, 3 and 4 respectively. The units 2 and 3 are nearly identical and unit 2 will first be described.

The shell of unit 2 is a glass tube 5 closed at its bottom by supporting plate 1 on which it is positioned by ring 6. It is closed at its top by cover plate 7. Tie rods 8 releasably connect cover plate 7 with supporting plate 1, so that the unit is held assembled but may be dismounted for cleaning. As used in a pilot installation the tube 5 was six inches in diameter and thirty-six inches long, so that the volume of milk actually in process at one time was small even though the unit handled 15,000 pounds of milk per hour. The relatively small diameter is considered to be a truly significant one.

The milk supply connection is a tube 9 of rather large diameter, closed at its lower end and having a lateral discharge slot 11 which subtends about 90° of arc, measured on the tube 9 and is directed toward the wall of tube 5 to which tube 9 is closely adjacent. Tube 9 leads through the cover plate 7. Milk discharging from slot 11 submerged in the milk causes considerable turbulence but does not cause foaming and for this reason the arrangement described is particularly important in the first purger unit 2.

Milk discharges from the bottom of the unit through connection 12.

Scrubbing air discharges from lateral ports 13 in a tube 14 whose upper end 15 is closed. The scrubbing air is atmospheric air drawn in through a filter 16 at a rate which may be modified by adjusting valve 17. The tube 14 leads through the bottom of the purger.

The suction connection 18 leads from a fitting 19 (called a Sanitrode by its makers) and then through a valve 20. Fitting 19 supports three control electrodes 21, 22, 23 of a suction control device known as the Lumenite control. It is a commercial device manufactured by Lumenite Electronic Company, of Chicago, and is not a novel feature of the invention. It is shown to typify any suction control capable of substitution. Several are available.

The purge unit 3 is similar to the purge unit 2 and its parts 5a to 23a correspond to and are essentially identical with the parts 5 to 23 of unit 2, except that tube 9a may be, and is shown as relatively more remote from the wall of tube 5a and opening 11a does not discharge so directly against that wall.

The moisture separator 4 comprises a tube 24 sealed to base 1 and having a closure cap 26 from the top of which the suction connection 27 leads to the vacuum pump 28 and gage 29. Separator 4 is simply a chamber of considerable volume into which the suction line 31 discharges through an upstanding tube 32. It is equipped with a drain valve 33. It affords conventional means to intercept moisture and condensed vapors from air approaching pump 28.

Milk from the supply such as a raw milk tank 34 flows through valve 35 through the cold milk path 36 in the regenerator (a heat recuperator). By partly closing valve 35 it is possible to reduce the absolute pressure in the regenerator. This is desirable with milk having a high occluded gas content, since it assists in freeing occluded gases. From path 36 the milk, warmed by heat exchange with treated milk, flows to tube 9, above described. It leaves the purger 2 through connection 12 and enters pump 37.

From pump 37 the milk flows through valve 38, which according to its setting, directs the milk through homogenizer 39 or around the homogenizer via by-pass 41. In either case it then flows through the heated path 42 in a heater having connections 43 for the heating fluid (say hot water) to connection 44 which leads to tube 9a of the purger 3.

The milk leaves purger 3 by line 12a and is fed by pump 45 through the holding coil 46. From this it flows by line 47 to the hot milk path in the regenerator where it gives up heat to cold milk flowing through coil 36. From the regenerator the flow is through cooler 48 of conventional type to cold milk tank 49 which supplies the bottler.

The pasteurizing cycle comprises heating in coil 36, further heating in coil 42, holding in coil 46, then cooling by interchange with coil 36 and then final cooling in cooler 48.

This flow path entails flow through the units 2 and 3 with attendant turbulent flow in each unit and contact with the scrubbing air. This air enters each unit from the atmosphere through filter 16 and valve 17 in the case of unit 2 and 16a and 17a in the case of unit 3. The pump 28 runs continuously and develops sub-atmospheric pressures in units 2 and 3.

These sub-atmospheric pressures must be controlled. They should be approximately equal in the two units but the more rapid disengagement of air and gases in the first unit tends to throw the two slightly out of balance, even though both are connected to the same suction line. Both connections 18, 18a communicate with line 31 which leads through separator 4 to the suction of pump 28.

Two solenoid valves 51, 52 control the admission of air to connection 18 and two similar solenoid valves 53, 54 perform similar functions as to connection 18a. Each solenoid valve shifts between open position and closed position. The rate of flow through each is fixed by an orifice, and as between 51 and 52 the latter offers a much larger flow rate. As between 53 and 54 the latter offers the larger rate.

With the pump 28 running and solenoid valves 51, 54 all closed, pressure will drop rapidly in line 31 and milk level in units 2 and 3 tends to rise. When it rises high enough to bridge 21 and 22 valve 51 opens. Bridging of 21a and 22a causes 53 to open. In normal control the opening and closing of 51 and 53 maintain the desired level. An abnormal rise to 23 or 23a opens valve 52 or 54 or both which would bleed so much air to line 31 as to lead to a rapid lowering of level.

The above is a loose statement of the functioning of the level control. The essential thing is the presence of some level control. The simplest and most sanitary scheme is control of pump suction. The control named is satisfactory, is commercially available and is offered as typical.

The invention blends the heat cycle of pasteurization with a two-stage purging system. The process is continuous and affects a relatively small quantity of milk at one time. The pump locations are favorable, air binding of heat exchangers is precluded, and mechanical agitation of the milk is notably absent.

What is claimed is:

1. Apparatus for removing occluded gases and volatiles from warm liquids, such as milk, comprising a closed container; means for supplying warm liquid to be treated to a zone near the bottom of said container; suction means for withdrawing gases and vapors from the top of said container; means responsive to liquid level in said container and serving to limit the suction developed by said suction means to values varying in inverse relation to the static head of liquid in said container whereby an approximately uniform static head of liquid is maintained; nozzle means for bleeding atmospheric air into said container below the liquid level, and for there discharging it as bubbles; a connection remote from said nozzle means for discharging liquid from the bottom portion of said container; and a pump for withdrawing liquid through the last-named connection.

2. The combination of two units as defined in claim 1; connections for establishing a liquid path serially through the first unit and then through the second unit; parallel connections between the tops of the two containers and the intake of the suction means; and means for delivering heat at pasteurizing temperatures to the liquid in said path at points one in advance of each unit.

3. The combination of two units as defined in claim 1; connections for establishing a liquid path serially through the first unit and then through the second unit; parallel connections between the tops of the two containers and the intake of said suction means; a heat exchanger in which milk entering said liquid path exchanges heat with milk discharging from said liquid path; adjustable means for throttling the flow of entering milk; and a heat exchanger for delivering heat to the milk as it flows between the first unit and the second unit.

4. The combination with the structure of claim 2 of a homogenizer interposed in the liquid path between said two units.

5. The combination with the structure defined in claim 2 of a homogenizer interposed in the liquid path between said two units and in advance of the second one of said means for delivering heat.

6. The combination defined in claim 1 in which the means which supplies liquid to a zone near the bottom of the container terminates in a nozzle which directs the liquid against a side of the tank.

7. The combination defined in claim 1 in which the means responsive to liquid level limits the suction by bleeding air at varying rates from the atmosphere into the intake of said suction means.

8. Apparatus for removing occluded gases and volatiles from milk, comprising an upright closed tubular container having a transverse dimension approximating six inches; means for supplying warm milk to be treated to a zone near the bottom of said container; suction means serving to withdraw gases and vapors from the top of said container; means responsive to liquid level in said container to limit the suction developed by said suction means to values varying in inverse relation to the static head of milk in said container whereby an approximately uniform depth of milk at least filling the lower half of said container is maintained; nozzle means for bleeding atmospheric air into the bottom of said container and for there discharging it to form a column of rising bubbles; a connection remote from said nozzle means for discharging liquid from the bottom of said container; and a pump for withdrawing milk through the last-named connection.

No references cited.